(12) United States Patent
Kim et al.

(10) Patent No.: US 7,454,627 B2
(45) Date of Patent: Nov. 18, 2008

(54) RECORDING MEDIUM CONTAINING COPYRIGHT INFORMATION, RECORDING APPARATUS AND RECORDING METHOD THEREFOR

(75) Inventors: Byung-jun Kim, Gyeonggi-do (KR); Jung-kwon Heo, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 766 days.

(21) Appl. No.: 10/092,354

(22) Filed: Mar. 7, 2002

(65) Prior Publication Data

US 2002/0129263 A1 Sep. 12, 2002

(30) Foreign Application Priority Data

Mar. 8, 2001 (KR) .......................... 2001-0011980

(51) Int. Cl.
*G06F 11/30* (2006.01)
(52) U.S. Cl. .................. 713/193; 713/189; 711/163; 711/164; 726/1; 726/2; 726/26
(58) Field of Classification Search ............ 713/193; 386/95; 705/51; 84/609; 726/57
See application file for complete search history.

(56) References Cited

U.S. PATENT DOCUMENTS

| | | | | | |
|---|---|---|---|---|---|
| 5,792,971 | A | * | 8/1998 | Timis et al. ................... 84/609 |
| 5,926,624 | A | * | 7/1999 | Katz et al. ................... 709/217 |
| 5,930,274 | A | * | 7/1999 | Kaniwa et al. ............... 714/811 |
| 5,960,398 | A | * | 9/1999 | Fuchigami et al. ........... 704/270 |
| 5,991,500 | A | * | 11/1999 | Kanota et al. ................. 386/94 |
| 6,075,920 | A | * | 6/2000 | Kawamura et al. ............. 386/95 |
| 6,081,897 | A | * | 6/2000 | Bersson ....................... 726/32 |
| 6,188,659 | B1 | | 2/2001 | Mueller et al. |
| 6,308,005 | B1 | * | 10/2001 | Ando et al. ................... 386/95 |
| 6,320,825 | B1 | * | 11/2001 | Bruekers et al. ......... 369/30.17 |

FOREIGN PATENT DOCUMENTS

| | | |
|---|---|---|
| CN | 1264122 | 8/2000 |
| EP | 1 005 040 A1 | 5/2000 |
| EP | 1 014 361 A2 | 6/2000 |
| EP | 1 158 514 A1 | 11/2001 |
| JP | 06-149905 | 5/1994 |
| JP | 08-227434 | 9/1996 |

(Continued)

OTHER PUBLICATIONS

European Search Report issued on Jul. 4, 2002, in European Application no. 02251527.4 (in English).

(Continued)

*Primary Examiner*—Kambiz Zand
*Assistant Examiner*—Roderick Tolentino
(74) *Attorney, Agent, or Firm*—Stein, McEwen & Bui, LLP

(57) ABSTRACT

A recording medium on which copyright information is recorded, and an apparatus and method therefor. The recording medium contains remake content made using at least one original content, original copyright information on the original content, and remake copyright information on the remake content. According to the recording medium and the apparatus and method therefor, the copyright of original content is protected and the personal user right of an individual user on the original content is guaranteed.

24 Claims, 5 Drawing Sheets

FOREIGN PATENT DOCUMENTS

| | | |
|---|---|---|
| JP | 8-227434 | 9/1996 |
| JP | 09-326888 | 12/1997 |
| JP | 11-112870 | 4/1999 |
| JP | 11-219320 | 8/1999 |
| JP | 11-219320 | 9/1999 |
| JP | 2000-003561 | 1/2000 |
| JP | 2000-113055 | 4/2000 |
| JP | 2000-182323 | 6/2000 |
| JP | 2000-207835 | 7/2000 |
| JP | 2000-251395 | 9/2000 |
| JP | 2000-315177 | 11/2000 |
| WO | WO00/52691 | 9/2000 |

OTHER PUBLICATIONS

Korean Office Action issued on Nov. 25, 2002, in Korean Application No. 2001-0011980 (in Korean with complete English translation).

Chinese Office Action issued on Jan. 16, 2004, in Chinese Application No. 02118690.1 (in Chinese with complete English translation).

Japanese Office Action issued on May 16, 2004, in Japanese Application No. 2002-062618 (in Japanese, no English translation).

Japanese Office Action issued on Jan. 4, 2005, in Japanese Application No. 2002-062618 (in Japanese English translation).

* cited by examiner

RECORDING MEDIUM CONTAINING COPYRIGHT INFORMATION, RECORDING APPARATUS AND RECORDING METHOD THEREFOR

CROSS-REFERENCE TO RELATED APPLICATIONS

This application claims the benefit of Korean Patent Application No. 2001-11980 filed on Mar. 8, 2001, in the Korean Intellectual Property Office, the disclosure of which is incorporated herein by reference.

BACKGROUND OF THE INVENTION

1. Field of the Invention

The present invention relates to a recording medium containing digital content data, a recording apparatus and method of recording and/or reproducing data on the recording medium, and more particularly, to a recording medium on which copyright information on the digital content data is recorded together with the digital content data, and a recording apparatus and method of recording and/or reproducing data on the recording medium.

2. Description of the Related Art

The International Standard Recording Code (ISRC) is an international identification code system for audio and music video recording provided by the Recording Industry Association of America (RIAA). The structure of an ISRC code is as follows:

Country: Country Code
Copyright Holder: Copyright Holder Code
Year of Recording: Year of Recording
Serial Number: Recording Number In addition, the RIAA defines different tracks as follows, so that different tracks need to receive different codes:

Remixes, edits or new versions of a track
Tracks with changed playing times
Partially used tracks (i.e., faded in or out)
Fully re-mastered tracks (tracks with fully restored sound quality)

When audio content is recorded on a Compact Disc (CD), the ISRC code is recorded together with the audio content. The recorded ISRC code provides copyright information and at the same time allows confirmation of whether or not the CD is an illegal copy. That is, by determining whether or not a catalog code generated by a predetermined digital signature algorithm based on an ISRC code is the same as a catalog code stored in a subchannel data stream of the CD, it is determined whether a CD is an original copy or an illegal copy.

Meanwhile, as a variety of digital recording media such as Digital Versatile Discs (DVDs) and Smart Cards have been developed and distribution of multimedia content data through networks has become widespread, a variety of data coding methods appropriate for recording media or transmission methods have been developed. Also, in line with the development of digital recording and/or reproducing apparatuses, individual users became able to sample, mix, or transform part of content data which is coded by a variety of coding methods such as an MPEG1, an MPEG2, an AC3, and DTS.

Individual users can mix or transform the original content according to their tastes so as to produce new remake content, unless the production is to make a profit. However, for example, if content data recorded on a CD is transformed and recorded on a Smart Card, it may cause a copyright problem. That is, according to the RIAA, in most cases, remake content is different from the original content. However, it is actually difficult for individual users to record ISRC codes, which are assigned by the RIAA after application, together with remake content whenever they produce remake contents. Accordingly, remake content produced for personal use cannot be distinguished from illegally produced remake content, so it becomes difficult to protect the copyright of the original content.

To solve this problem, sometimes an encrypted code is inserted when original content is copied so that illegal copying is prevented. However, this method results in restrictions on the personal right of individual users who buy the CD containing the encrypted code.

SUMMARY OF THE INVENTION

Accordingly, it is an object of the present invention to provide a recording method and apparatus to protect the copyright of original content and to guarantee the personal use rights of an individual user on the original content.

It is another object of the present invention to provide a recording medium in which data is recorded so that the copyright of original content is protected and the personal use right of an individual user on the original content is guaranteed.

Additional objects and advantages of the invention will be set forth in part in the description which follows and, in part, will be obvious from the description, or may be learned by practice of the invention.

The foregoing and other objects of the present invention are achieved by providing a recording medium containing: remake content made based on at least one original content; original copyright information on the original content; and remake copyright information on the remake content.

The remake copyright information includes a producer code of an apparatus used in making the remake content, and an identification code of the apparatus.

The remake copyright information further includes encoding information by which The remake copyright information further includes the version of the remake copyright information.

The remake copyright information further includes information on the number of times that the remakes of the original content is permitted.

The remake content is recorded in at least one audio packet containing audio data, and the original copyright information and the remake copyright information are recorded in a private header containing header information on the remake content.

The foregoing and other objects of the present invention are further achieved by providing a method of recording content on a recording medium, the method comprising: making a remake content based on at least one original content; recording the remake content; and recording original copyright information on the original content and remake copyright information on the remake content.

During the making of a remake content, the remake content is made by sampling the original content.

Also during the making of a remake content, the remake content is made by a different coding method from a coding method by which the original content is made.

Also during the making of a remake content, the remake content is made by reading the original content from a predetermined recording medium and recording the original content in a different recording medium.

During the recording of the remake content, the remake content is recorded as at least one audio packet containing the remake content, and during the recording of original copyright information on the original content and remake copyright information on the remake content, original copyright information on the original content and remake copyright information on the remake content are recorded in a private header for at least one audio packet in which the remake content is recorded.

The foregoing and other objects of the present invention may also be achieved by providing an apparatus to record content on a recording medium having a converting unit to convert at least one original content into a remake content; a processor to generate original copyright information on the original content and remake copyright information on the remake content as a copyright information; and a recording unit to record the remake content obtained by the converting unit, and identification information and copyright information generated by the processor.

The converting unit has a decoder to decode the original content; and an encoder to encode the original content decoded by the decoder into a remake content.

The apparatus further has a reading unit to read the original content and the original copyright information from a predetermined recording medium, in which the processor generates identification information of the original content by receiving the original copyright information from the reading unit and outputting the original copyright information.

The recording unit records the original copyright information and the remake copyright information in a header in which header information on the remake content is recorded.

BRIEF DESCRIPTION OF THE DRAWINGS

These and other objects and advantages of the present invention will become apparent and more readily appreciated from the following description of the embodiments, taken in conjunction with the accompanying drawings of which.

DETAILED DESCRIPTION OF THE PREFERRED EMBODIMENTS

Figure 1:
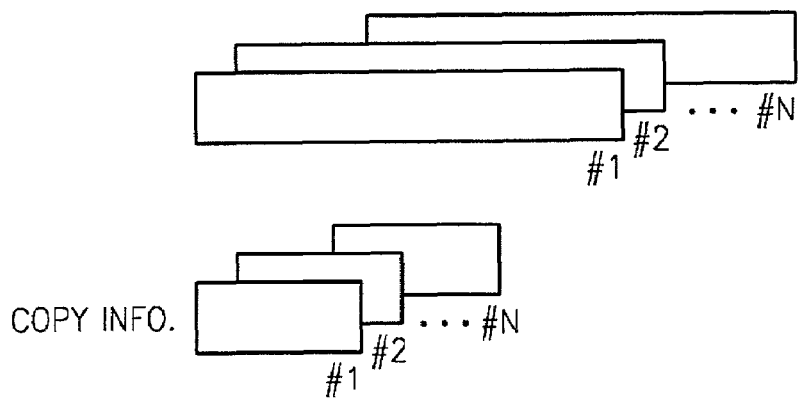
FIG. 1 is a schematic diagram illustrating remake content of a recording medium recorded by a recording apparatus according to an embodiment of the present invention.

Reference will now be made in detail to the embodiments of the present invention, examples of which are illustrated in the accompanying drawings, wherein like reference numerals refer to the like elements throughout. The embodiments are described below in order to explain the present invention by referring to the figures.

Referring to FIG. 1, N remake contents and N copyright information items corresponding to the N remake contents are recorded on a recording medium.

A remake content is produced based on at least one or more original contents. For example, the remake content is produced by sampling a part of an original content by changing the number of channels of the original content through transformation of the code, by changing the recording medium, or by re-mixing the original content. An individual user can change the number of channels of the original content by transforming the code, or by storing the original content in a different medium when necessary. Thus, the obtained content is the remake content.

Copyright information (Copy Info) may be included in the remake content or may be separately recorded. Also, the copyright information includes original copyright information on the original content and remake copyright information on the remake content. The original copyright information includes copyright-related information of the original content such as the author and the recording year and date. The original copyright information according to the present invention is an ISRC code. The remake copyright information may include copyright-related information of the remake content such as the author and the recording year and date of the remake content.

Figure 2:
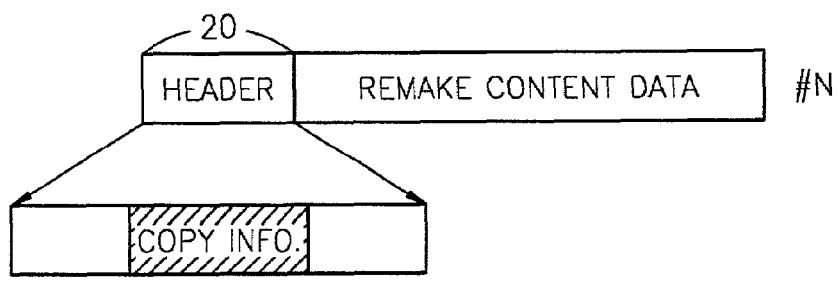
FIGS. 2 and 3 are examples of the remake content of FIG. 1.
Figure 3:
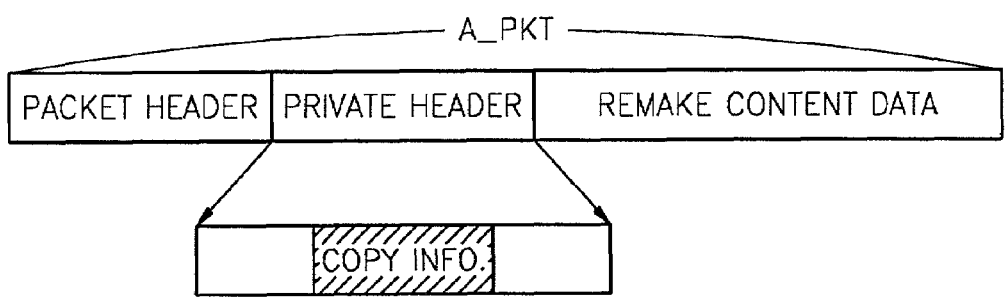

FIGS. 2 and 3 are examples of the remake contents of FIG. 1. When remake content #N is formed of a header 20 in which header information is recorded and remake content data forms the remake content, copyright information (Copy Info) is recorded in the header 20. Referring to FIG. 3, in the case where audio data is recorded complying with a DVD-Audio specification, a remake content is recorded in an audio packet A_PKT, which includes a packet header, a private header in which header information on the remake content data is recorded, and the remake content data. In the private header, copyright information (Copy Info) is recorded.

Figure 4:
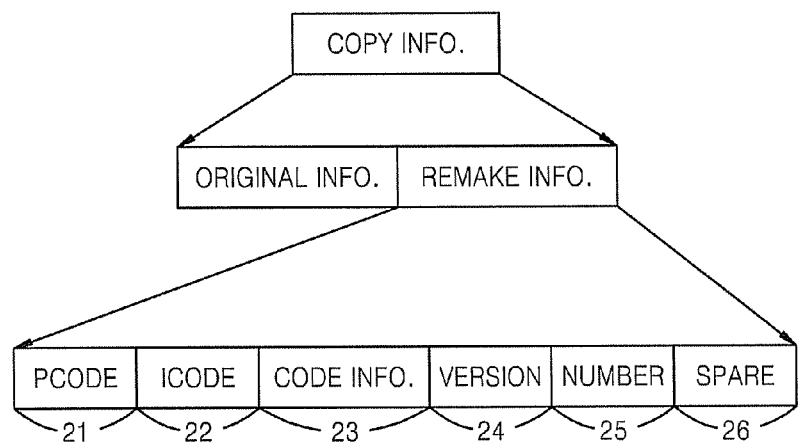
FIG. 4 is a diagram of a structure providing a detailed explanation of remake copyright information as copyright information.

FIG. 4 is a diagram of a structure providing a detailed explanation of remake copyright information as copyright information.

Referring to FIG. 4, remake copyright information according to the present invention includes a producer code (P Code) 21, an identification code (I Code) 22, encoding information (Code Info) 23, version information (Version) 24, the number of permitted remakes (Number) 25, and a spare space (Spare) 26.

The producer code (P Code) 21 indicates a maker who produced an apparatus used to make the remake content. The producer code (P Code) 21 should have enough digits to be assigned to software tool producers as well as hardware makers. The identification code (I Code) 22 is an identifier related to the apparatus used to make the remake content. The identification code (I Code) is given to the apparatus because apparatuses made by the same producer may have different specifications. The identification code (I Code) 22 may be given in a variety of ways, for example, the identification code (I Code) 22 may be given to distinguish an apparatus capable of transforming data to a predetermined encoding format from an apparatus which is not capable of transforming data to a predetermined encoding format. Encoding information (Code Info) 23 indicates an encoding method used to record the remake content. Using this information, a reproducing apparatus can determine whether or not the remake content can be reproduced. Also, if the author (copyright holder) of the original content decides which encoding method should be applied to the author's recording and which encoding method should not, the encoding information (Code Info) 23 is read and used to determine whether or not transforming is permitted. The version information (Version) 24 indicates the version of the remake copyright information itself, because the location or length of a field may be different in apparatuses having different versions. The number of permitted remakes (Number) 25 indicates the number of remakes the author (copyright holder) of the original content permits for the original content. For example, if a remake content is recorded and 3 is recorded together as the number of permitted remakes, the number of permitted remakes of the original content is 3. That is, if a remake content is made based on the original content, the number of permitted remakes to be recorded with the newly made remake content is 2—obtained by subtracting 1 from 3. The spare space (Spare) 26 indicates a spare space for a field to be added to remake copyright information.

Figure 5:
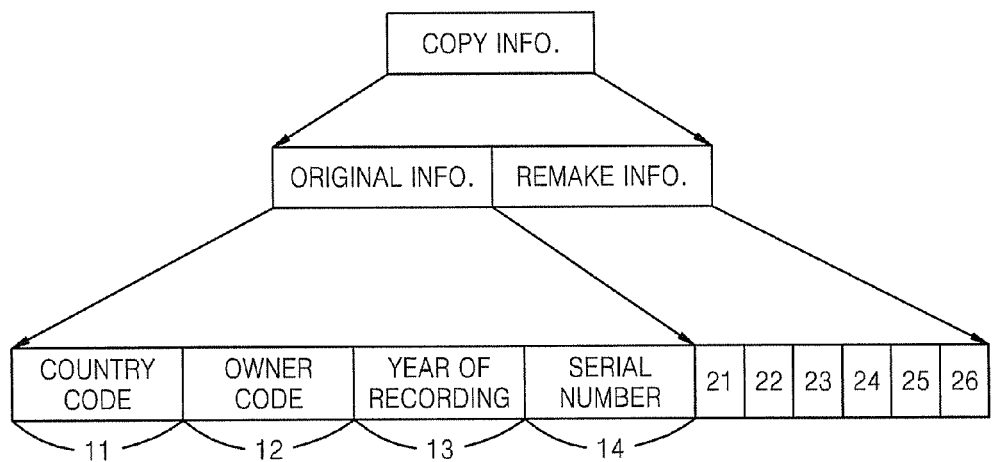
FIG. 5 is a diagram of a structure providing a detailed explanation of original copyright information as copyright information.

FIG. 5 is a diagram of a structure providing a detailed explanation of original copyright information as copyright information.

Referring to FIG. 5, the original copyright information is an ISRC code according to an embodiment of the present invention, and includes a country code 11, an owner code 12, a year of recording 13, and a serial number 14.

Thus, as illustrated in FIGS. 4 and 5, copyright information on the remake content (Copy Info) includes copyright information on the original content and the remake content.

Figure 6:
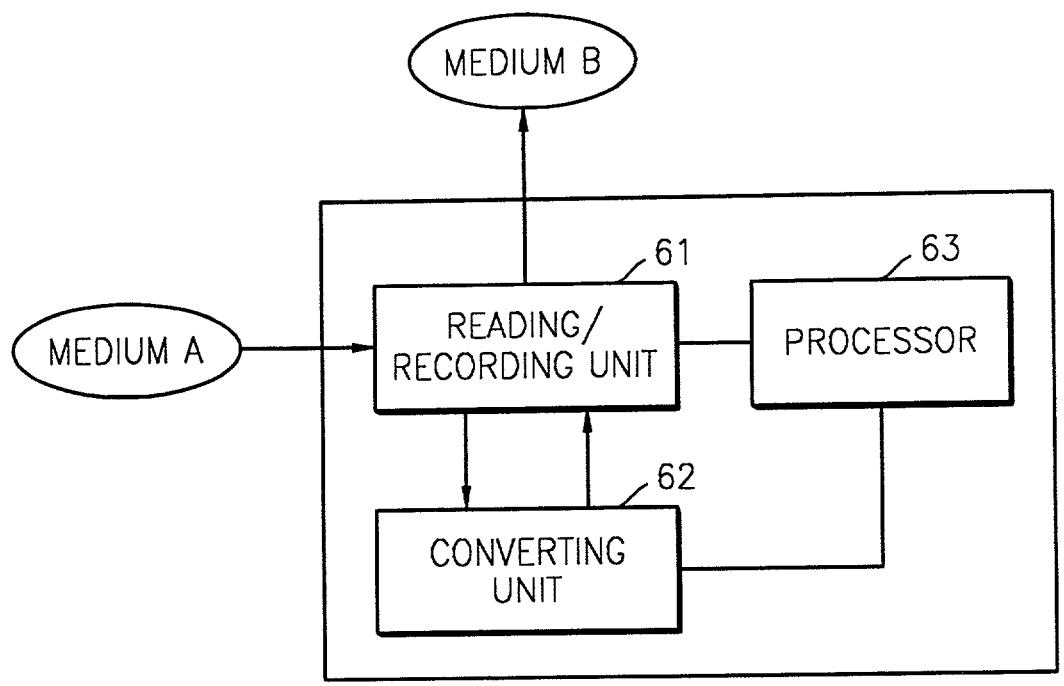
FIGS. 6 and 7 are block diagrams of a recording apparatus according to an embodiment of the present invention.
Figure 7:
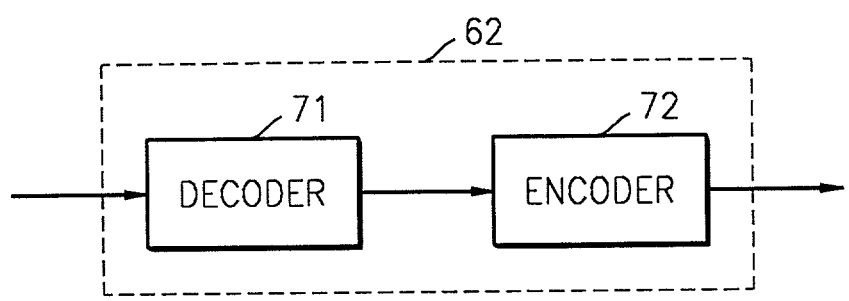

FIGS. 6 and 7 are block diagrams of a recording apparatus according to an embodiment of the present invention.

The recording apparatus of FIG. 6 reads an original content from medium A, remakes the original content and records the remake content on medium B. The recording apparatus includes a reading and/or recording unit 61, a converting unit 62, and a processor 63. Here, media A and B may indicate intangible recording media, such as carrier waves containing the original content, as well as tangible recording media such as CDs, DVDs, and HDDs. Also, media A and B may be the same media or different media.

The reading and/or recording unit 61 reads the original content from medium A and records the remake content on medium B. Also, the reading and/or recording unit 61 records original copyright information and remake copyright information on medium B. The converting unit 62 converts the original content into remake content by a predetermined method. Here, a variety of methods of converting the original content into the remake content, such as sampling, transforming the code, changing a recording medium, etc., as described above, may be adopted. The processor 63 generates copyright information on the remake content. According to the present embodiment, the reading and/or recording unit 61 reads the ISRC code of the original content recorded on medium A, as the original copyright information. The processor 63 knows in advance the producer code (P Code) 21, the identification code (I Code) 22, version information (Version) 24, and the number of permitted remakes (Number) 25 in the remake copyright information on the remake content. That is, since the remake copyright information is recorded in a memory (not shown) such as a ROM in advance by the manufacturer of the recording apparatus, the processor 63 obtains the remake copyright information by reading the remake copyright information recorded in the memory. However, the encoding information (Code Info) 23 is obtained after determining an encoding method used for a remake content. As encoding information, information indicating an encoding method used in generating a remake content among encoding methods supported by the recording apparatus is selected. The number of permitted remakes (Number) 25 and the spare space (Spare) 26 may be selected optionally. If an author (copyright holder) of the original content records the number of permitted remakes when the original content is first recorded, the reading and/or recording unit 61 reads the number of permitted remakes M from medium A, and records a number, which is obtained by subtracting 1 from M, as remake copyright information on medium B. Accordingly, M−1 is recorded on medium B on which remake content is recorded. Later, if 0 is recorded as the number of permitted remakes, remaking content is not permitted.

Referring to FIG. 7, the converting unit 62 may include a decoder 71 and an encoder 72. The decoder 71 decodes the original content and the encoder 72 encodes the decoded original content in a new encoding method and generates a remake content.

Figure 8:
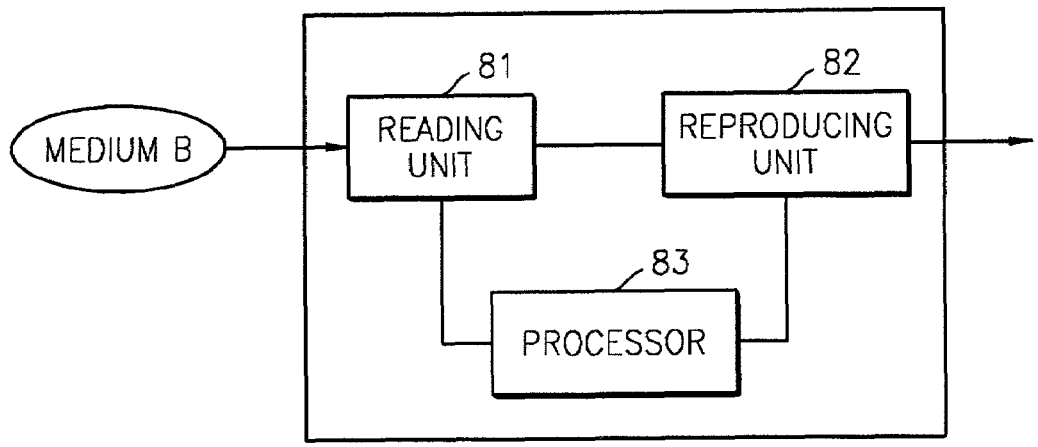
FIG. 8 is a block diagram of a reproducing apparatus to reproduce data from a recording medium on which a remake content and copyright information thereof are recorded according to an embodiment the present invention.

FIG. 8 is a block diagram of a reproducing apparatus to reproduce data from a recording medium on which remake content and copyright information thereof are recorded according to an embodiment of the present invention.

Referring to FIG. 8, the reproducing apparatus includes a reading unit 81, a reproducing unit 82, and a processor 83. The reading unit 81 reads copyright information on the remake content from medium B, and provides the information to the processor 83. Using information included in the read copyright information, the processor 83 determines whether or not a corresponding remake content can be reproduced. If the remake content can be reproduced (decoding corresponding to the encoding method used in the remake content is supported), the processor 83 sends a command to read the remake content to the reading unit 81. The remake content read by the reading unit 81 is provided to the reproducing unit 82 and reproduced.

Figure 9:
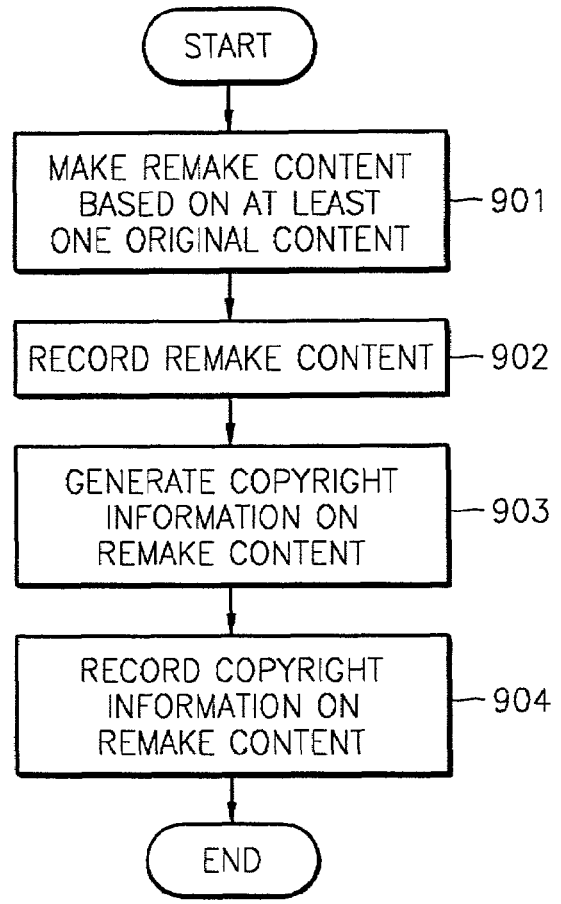
FIG. 9 is a flowchart illustrating a recording method according to an embodiment of the present invention.

FIG. 9 is a flowchart illustrating a recording method according to an embodiment of the present invention.

Referring to FIG. 9, an individual user reads the original content from medium A through the reading and/or recording unit 61 of the recording apparatus according to an embodiment of the present invention. Using at least one original content which is read, the converting unit 62 generates a remake content in operation 901.

The reading and/or recording unit 61 records the remake content on medium B in operation 902. The processor 63 generates copyright information on the remake content in operation 903. Here, copyright information on the remake content includes remake copyright information and original copyright information which is copyright information on the original content. The reading and/or recording unit 61 records copyright information on the remake content on medium B in operation 904. However, operation 902 may be performed after operations 903 or 904 when necessary. This is for a DVD-Audio, in which a packet header is recorded first.

Figure 10:
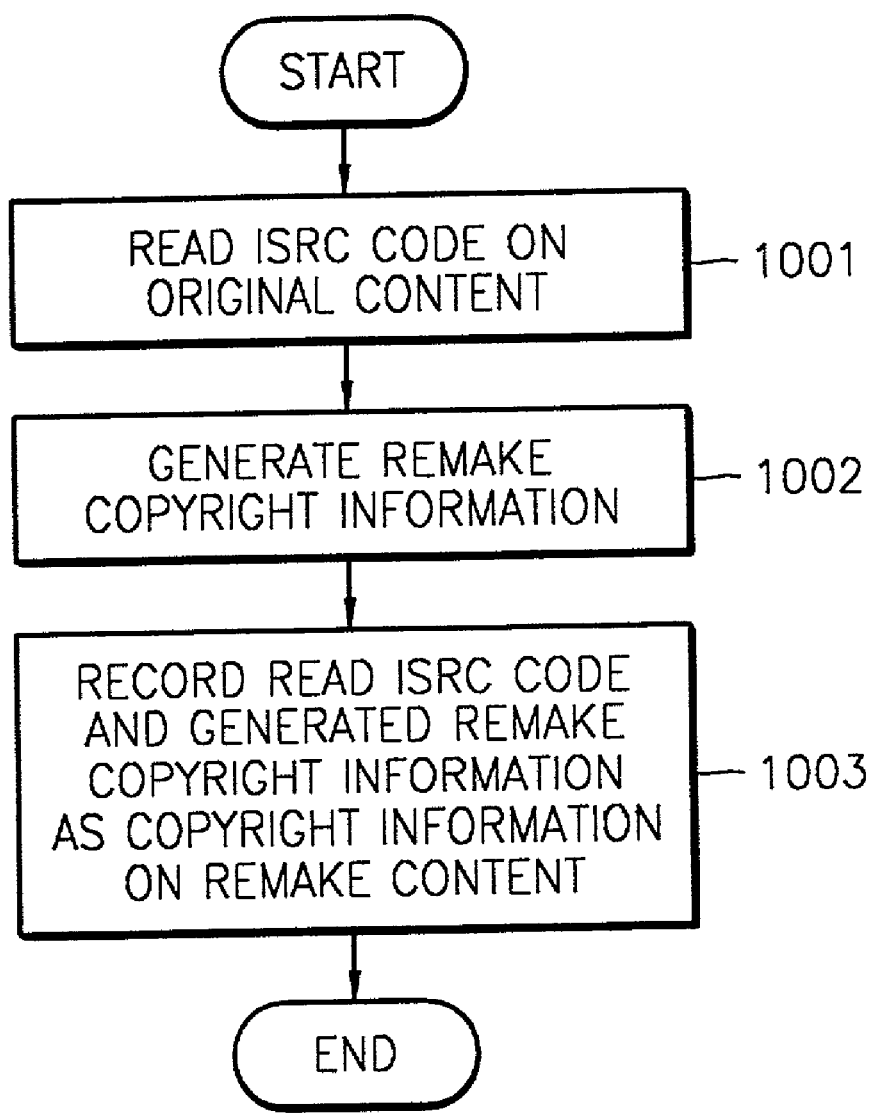
FIG. 10 is a flowchart illustrating operations 903 and 904 of FIG. 9.

FIG. 10 is a flowchart illustrating operations 903 and 904 of FIG. 9.

Referring to FIG. 10, the reading and/or recording unit 61 of the recording apparatus reads the ISRC code of the original content from medium A in operation 1001 and generates remake copyright information on the remake content in operation 1002. The generated remake copyright information together with the read ISRC code are recorded in the header 20 as copyright information on the remake content. In a DVD-Audio, copyright information on the remake content may be recorded in a private header for the remake content data.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A recording medium comprising:
   at least one original content;
   a remake content made based on the at least one original content; and
   copyright information corresponding to the remake content;
   wherein:
   the copyright information includes original copyright information which, when processed by a processor, is used to identify at least a copyright owner of the original content, and remake copyright information which, when processed by the processor, is used to identify at least a maker of the remake content representing a user that is different from the copyright owner of the original content;
   the remake copyright information includes a producer code of an apparatus used in making the remake content, and an identification code of the apparatus used to identify the maker of the remake content; and
   the original copyright information includes a country code, an owner code, a year of recording, and a serial number.

2. The recording medium according to claim 1, wherein the remake copyright information further includes encoding information by which the processor determines whether reproducing the remake content is possible.

3. The recording medium according to claim 2, wherein the remake copyright information further includes the version of the remake copyright information.

4. The recording medium according to claim 1, wherein the remake copyright information further includes information on the number of times that remakes on the original content is permitted.

5. The recording medium according to claim 1, wherein the remake content is recorded in at least one audio packet containing audio data, and the original copyright information and the remake copyright information are recorded in a private header containing header information on the remake content.

6. A method of recording content on a recording medium, comprising:
   making a remake content based on at least one original content;
   recording the remake content on the recording medium; and
   generating and recording copyright information corresponding to the remake content on the recording medium,
   wherein:
   the copyright information includes original copyright information to identify at least a copyright owner of the original content, and remake copyright information to identify at least a maker of the remake content on the recording medium representing a user that is different from the copyright owner of the original content;
   the remake copyright information includes a producer code of an apparatus used in making the remake content, and an identification code of the apparatus used to identify the maker of the remake content; and
   the original copyright information includes a country code, an owner code, a year of recording, and a serial number.

7. The method according to claim 6, wherein during the making of a remake content, the remake content is made by sampling the original content.

8. The method according to claim 6, wherein during the making of a remake content, the remake content is made by a different coding method from a coding method by which the original content is made.

9. The method according to claim 6, wherein during the making of a remake content, the remake content is made by reading the original content from another recording medium and recording the original content in the recording medium different from the another recording medium.

10. The method according to claim 6, wherein the original content includes audio data or video data.

11. The method according to claim 6, wherein during the recording of the remake content, the remake content is recorded as at least one audio packet containing the remake content, and during the recording of the copyright information, the original copyright information and the remake copyright information are recorded in a private header for at least one audio packet in which the remake content is recorded.

12. An apparatus to record content on a recording medium, comprising:
   a converting unit to convert at least one original content into a remake content;
   a processor to generate copyright information including original copyright information used to identify at least a copyright owner of the original content, and remake copyright information including identification information relating to the apparatus on the remake content that is different from the copyright owner of the original content; and
   a recording unit to record the remake content obtained by the converting unit, the identification information and the copyright information generated by the processor on a recording medium;
   wherein the identification information of the remake copyright information includes a producer code of the apparatus used in making the remake content, and an identification code of the apparatus used to identify the maker of the remake content; and
   the original copyright information includes a country code, an owner code, a year of recording, and a serial number.

13. The apparatus according to claim 12, wherein the converting unit comprises:
   a decoder to decode the original content; and
   an encoder to encode the original content decoded by the decoder into a remake content.

14. The apparatus of claim 12, further comprising:
   a reading unit to read the original content and the original copyright information from the recording medium,
   wherein the processor generates identification information of the original content by receiving the original copyright information from the reading unit and outputting the original copyright information.

15. The apparatus according to claim 14, wherein the recording unit records the original copyright information and the remake copyright information in a header in which header information on the remake content is recorded.

16. The apparatus according to claim 12, wherein the remake copyright information further includes at least one of encoding information of the remake content, and the version of the remake copyright information.

17. The apparatus according to claim 16, wherein the remake copyright information further includes information on the number of times that the remakes on the original content is permitted.

18. The apparatus according to claim 12, wherein the original content includes audio data or video data, and the original copyright information is an International Standard Recording Code (ISRC).

19. The method according to claim 11, wherein the recording includes decrementing the number of remakes and recording the decremented number as copyright remake content.

20. The apparatus according to claim 15, wherein the recording unit decrements the number of remakes and records the decremented number as copyright remake content.

21. An apparatus to reproduce information from a recording medium, on which a remake content made based on at least one original content and copyright information on the remake content are recorded, the apparatus comprising:

a reading unit to read copyright information on a remake content from the recording medium, including original copyright information to identify at least a copyright owner of the original content and remake copyright information to identify at least a maker of the remake content representing a user that is different from the copyright owner of the original content;

a processor to determine whether the remake content of the recording medium is reproducible based on the copyright information read from the reading unit, and if the remake content is reproducible, to issue a command to the reading unit to read the remake content; and a reproducing unit to receive and reproduce the remake content read from the reading unit;

wherein:

the remake copyright information includes a producer code of an apparatus used in making the remake content, and an identification code of the apparatus used to identify the maker of the remake content; and the original copyright information includes a country code, an owner code, a year of recording, and a serial number.

22. The apparatus according to claim 21, wherein the reproducing unit further comprises a decoding unit to decode the remake content received.

23. The apparatus according to claim 21, wherein the remake copyright information further includes at least one of a encoding information of the remake content, and the version of the remake copyright information.

24. A method of reproducing a remake content recorded on a recording medium based on at least one original content, comprising:

reading copyright information from a recording medium, including original copyright information to identify at least a copyright owner of the original content and remake copyright information to identify at least a maker of the remake content recorded on the recording medium representing a user that is different from the copyright owner of the original content;

determining whether a remake content is reproducible from the recording medium based on the copyright information;

reading the remake content from the recording medium if the remake content is determined to be reproducible; and reproducing the remake content from the recording medium;

wherein:

the remake copyright information includes a producer code of an apparatus used in making the remake content, and an identification code of the apparatus used to identify the maker of the remake content; and the original copyright information includes a country code, an owner code, a year of recording, and a serial number.

\* \* \* \* \*